Oct. 9, 1934.   J. C. OLSEN   1,975,862
HINGED FASTENING
Filed April 26, 1933
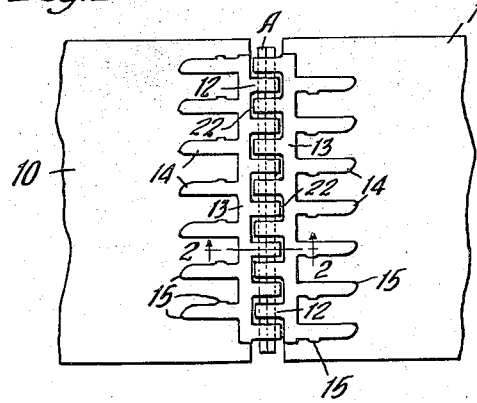
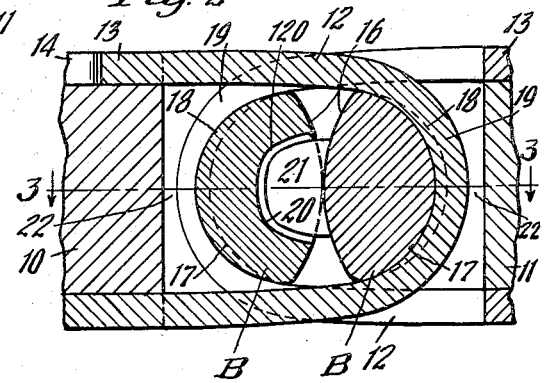
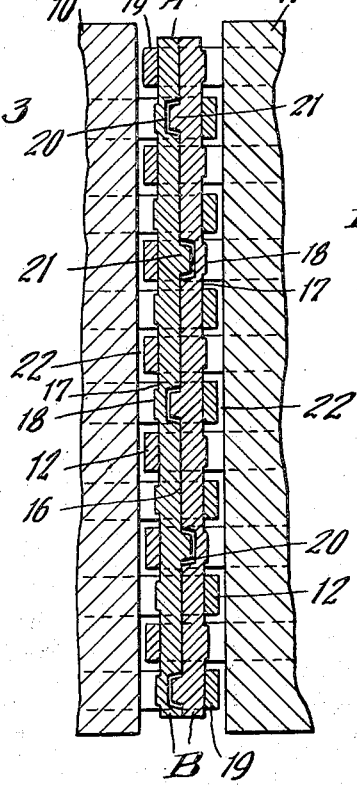
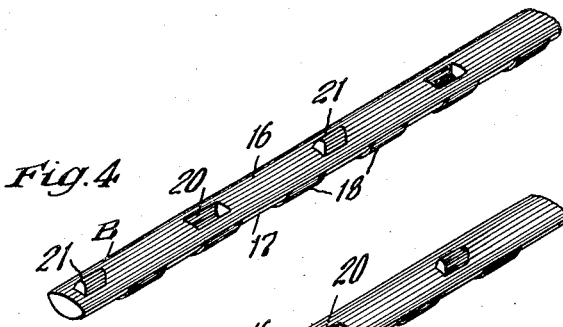
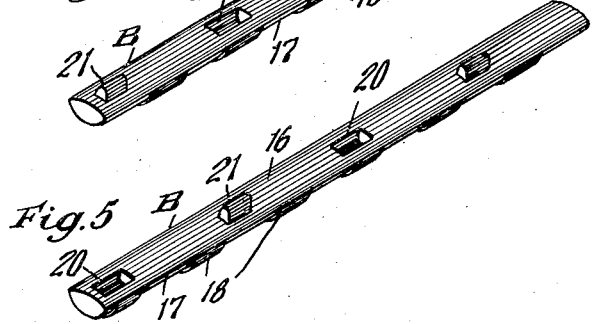
Inventor
John C. Olsen
By Joseph Harris
   His Atty.

Patented Oct. 9, 1934

1,975,862

UNITED STATES PATENT OFFICE 1,975,862

HINGED FASTENING

John C. Olsen, Chicago, Ill., assignor to Flexible Steel Lacing Company, Chicago, Ill., a corporation of Illinois Application April 26, 1933, Serial No. 667,994

10 Claims. (Cl. 24—33)

This invention relates to improvements in hinged fastening.

In flexible or hinged types of fastenings for machinery belts, conveyor belts and like flexible power transmitters, a serious difficulty encountered is that due to excessive wear produced by the constant and rapid pivotal action produced in the fastenings while passing around the pulleys or wheels. When an ordinary round hinge pin is used, whether of metal or rawhide, the wear is especially rapid on the contacting surfaces of both the hinge or loop elements and the pin which must constantly rotate relative to each other. Various forms of so-called sectional or rocker hinge pins have heretofore been proposed and used and, while superior to the ordinary round pin, have not given the desired satisfactory results due primarily to the fact that the pivotal or rocking actions thereof are not either true pivotal or rolling movements; a "whipping" action takes place each time the belt ends are deflected from the straight or tangent line of travel to the circular line of travel while passing onto and around the pulleys; and the pin sections slide on or scuff each other, causing relatively rapid wear.

One object of this invention is to provide an efficient and durable sectional hinge pin for belt fastenings and the like, the pin having large bearing areas and the elements or sections so formed and cooperating that a true rolling action on each other is always insured and relative sliding, shifting or scuffing of the sections is reduced to a minimum during all movements of the belt.

Another object of the invention is to provide a sectional hinge pin of the character above indicated of which both sections or elements thereof are of like form and of such construction that the same may be manufactured at minimum expense by rolling with a single set of rolls for each given size.

A further object of the invention is to provide a flexible interdigitated loop-type of fastening for belt ends and the like employing a sectional hinge pin wherein the sections or elements of the pin are always maintained snugly seated in the apices of the respective fastening loops; relative movement between the pin elements of sections, in passing onto and around the pulleys, is confined to a true rolling, non-slipping or non-scuffing action to thereby prevent excessive wear; whipping and impacting of the pin sections or elements against the loops is eliminated or minimized; and, further, to maintain the loops properly spaced from each other to prevent wear therebetween.

Still another object of the invention is to provide a sectional hinge pin usable with a well known type of belt lacing now extensively in use without modification of the latter or its mode of application, to provide a hinge pin of the type indicated which may be cut or broken off to any desired length for different widths of belt and, further, to so form the pin that, when in place, the same cannot accidentally be displaced.

Other objects of the invention will more clearly appear from the description and claims hereinafter following.

In the drawing forming a part of this specification, Figure 1 is a top plan view of portions of adjacent ends of a belt showing the improved fastening applied thereto. Figure 2 is a vertical sectional view upon an enlarged scale, taken lengthwise of the belt and corresponding to the section line 2—2 of Figure 1. Figure 3 is a horizontal sectional view corresponding to the section line 3—3 of Figure 2 but upon a somewhat reduced scale. And Figures 4 and 5 are detailed perspectives of the two elements of the improved hinge pin, the relation of the two elements shown in said figures being such that, upon turning of the element shown in Figure 4, through an angle of 180° and then moving the same toward the element shown in Figure 5, the two elements will then be in complemental relation and constitute the complete pin.

In said drawing, the adjacent ends of the belt, conveyors or other like flexible power transmitter, are indicated at 10 and 11. To each of these is secured a fastening proper which, in the embodiment chosen for illustration, consists of a series of spaced loops 12—12 all integrally connected by a connecting strip 13, the fastener being provided with laterally spaced and oppositely extending inner and outer sets of tangs 14—14 having the usual clinching prongs 15—15 imbedded into the belt material. The two sections of fastener proper or lacing are so arranged that the respective loops thereof are alternated or interdigitated in the customary manner, the loops being thus alined transversely of the belt for the reception of the hinge pin designated generally by the reference character A. As will be understood by those skilled in the art, various other forms of loop type of fastening may be employed without departing from the spirit of the invention. The one chosen for illustration is well known and in extensive use and the improved hinge pin hereinafter described, is especially adapted for use therewith either to replace old hinge pins or in new applications.

The improved hinge pin comprises two preferably like sections or elements designated B—B. Each of said elements B is provided along its inner face with a curved convex longitudinally extending bearing surface 16, the surfaces of the two elements being opposed when the pin is in assembled position and adapted to roll on each other as clear from Figure 2. On the side opposite to the convex bearing surface 16, each element B is provided with alternated curved seats 17 and lugs or projections 18. The seats 17 are made of such contour as to snugly fit or seat within the rounded apices 19 of one set of loops and correspondingly spaced. The lugs 18 are so located as to be positioned between each pair of loops of the fastener proper within which the corresponding element B is seated, as above described. In actual practice, the seats 17 will be slightly longer than the width of each loop and the lugs 18 preferably slightly shorter than the width of the loops so as to provide clearance when the pin is in operative position and prevent undue wear.

On their inner bearing faces, each element B is provided with longitudinally spaced and alternated recesses or pockets 20 and lugs or projections 21, the spacing preferably being such that the recesses 20 come opposite each third outside lug 18 and the lugs 21 opposite each third bearing seat 17, as clearly shown in Figures 3, 4 and 5. In this manner, any slight weakening of the pin elements due to the recessing is compensated for by the lugs 18 on the opposite side. Referring to Figure 2, it will be noted that the lugs and recesses 20 and 21 are centrally disposed vertically of the pin as there shown and in line with the tension on the belt when the latter is traveling straight. Each recess 20 is of approximately semi-circular section transversely of the pin, as indicated at 120 and, correspondingly, each cooperating lug is of similar contour but of slightly lesser cross section so as to permit perfect freedom of movement of the lugs 21 within the recesses 20 when the two elements B roll on each other or move relatively angularly. In Figure 2, the clearance between the recesses 20 and lugs 21 has been somewhat exaggerated in order to better illustrate the construction. In actual practice, the clearance will be only such as to permit the necessary relative rolling or angular movements of the lugs within the recesses without excessive wear and to prevent any appreciable relative bodily shift of the two elements B—B vertically, as viewed in Figure 2, that is, normal to the line of tension between the belt ends. Stated otherwise, while the inter-engaging lugs and recesses 20 freely permit of the rolling of the two elements one on the other, the two elements B are nevertheless prevented from any appreciable bodily shift in lines normal or perpendicular to the plane of the belt itself, thus eliminating sliding friction or scuffing of the two rolling bearing surfaces 16—16 and confining the movement between the two elements to a true rolling action involving minimum friction.

Referring more particularly to Figure 3, it will be noted that the lugs 21 are only slightly shorter than the recesses 20, considered lengthwise of the pin elements. With this construction, the elements B—B are prevented from any appreciable shift lengthwise of each other, thus eliminating or minimizing sliding wear or scuffing that might otherwise occur from such movements. Further, the cooperating lugs and recesses 21—20, in conjunction with the outside retaining lugs and seats 18—17, result in another advantage, namely, the maintenance of the loops in properly separated position—considered lengthwise of the pin, thus preventing the side edges of the loops from coming into contact with each other and preventing wear of the loops on each other.

As clear from the preceding, when the two elements B—B of the pin are seated in their respective alternated sets of loops, not only are the pin elements prevented from bodily shift relatively to each other either longitudinally or transversely, but also each pin element is prevented from bodily shift with respect to its corresponding set of loops, thus eliminating whipping action that would otherwise occur when the belt is deflected from a straight line of travel onto and around a pulley. By employing the lugs and recesses 20—21 only at spaced intervals, ample areas of curved surfaces are provided effective for true rolling action in every position that may be assumed by the pin elements.

As previously indicated, the pin elements B are preferably of like construction and are of such form that the same may be readily rolled from bar stock. Obviously, the same may be cut or broken off to any desired length corresponding to the width of the particular belt with which used. When two sections have been cut or broken to the desired length, the same will be longitudinally offset, as illustrated by Figures 4 and 5, so as to bring the lugs 21 of the one element directly opposite to the recesses 20 of the other element, thus making the two elements, in effect, complemental when so arranged and which will be evident by considering the element B, shown in Figure 4, turned through an angle of 180° and then lowered so as to seat the lugs 21 in the recesses 20 of the element B of Figure 5.

In applying the fastening, each set of loops is first applied to its respective belt end in the well known manner. The two sets of loops are then brought together in alternate or interdigitated relation and in transverse alinement, the two belt ends being brought as close together as possible and taking up the spaces indicated at 22—22 between the outer ends of each set of loops and the butt end of the other belt end so as to obtain the maximum distance, horizontally, between the two sets of loops, as viewed in Figure 2. The two pin elements B—B, properly assembled, are then inserted endwise through the loops until the pin is in proper position. In this position, the seats 17 are opposite their respective corresponding sets of loops and the outer lugs 18 therebetween, whereupon the belt ends are drawn apart to seat the apices 19 of the loops on the respective bearing seats 17 of the pin elements, as best shown in Figure 3. Obviously, when load on the belt is applied, the tension therein will be sufficient to maintain this condition, the lugs 18 serving to prevent any accidental longitudinal displacement of the hinge pin.

By making each of the pin elements of like construction, it is obvious that the cost of production may be kept at a minimum and the construction of the pin elements is such as to readily adapt the same for manufacture by rolls, further contributing to the lowered cost of production.

The invention has been illustrated and described with particular reference to a fastening for ordinary power-transmitting belt but, as will be understood by those skilled in the art, the invention is applicable to other types of flexible power transmitters wherein one or more flexible joints are incorporated therein and all changes and modifications are contemplated that come within the scope of the claims appended hereto.

What is claimed is:

1. As an article of manufacture, a hinge pin for belt fastenings and the like, said pin comprising two elements having engaging, opposed, convexly curved rolling bearing surfaces, said elements having also cooperating, interengaging, relatively angularly adjustable formations on their respective curved bearing surfaces, limiting relative bodily shift of the elements in a direction normal to the rolling lines of bearing contact.

2. As an article of manufacture, a hinge pin for a belt fastening of the interdigitated loop type, said pin comprising two elements having opposed curved bearing surfaces adapted to roll one on the other, and a plurality of spaced sets of cooperating interengaging formations on the two pin elements adapted to restrain relative bodily shift between the pin elements while permitting rolling movement.

3. As an article of manufacture, a hinge pin for belt fastenings and the like, said pin comprising two like elements each having a longitudinally extending convex bearing surface and cooperating interengaging formations, at spaced intervals on said convex surface.

4. As an article of manufacture, a hinge pin for belt fastenings, said pin comprising two elements having opposed curved bearing surfaces adapting the elements to adjust themselves relatively angularly, said elements being provided on the opposed bearing surfaces with complemental sockets and projections also angularly relatively adjustable.

5. As an article of manufacture, a hinge pin for belt fastenings and the like, said pin comprising two like elements each having a longitudinally extending convex bearing surface and alternated recesses and lugs on and spaced longitudinally of said bearing surfaces.

6. In a belt fastening, the combination with a plurality of interdigitated fastening loops adapted to be secured to the respective ends of a belt; of a hinge pin extended through said loops, said pin comprising two elements having cooperating longitudinally extending curved bearing surfaces, each element being provided on the side opposite to said bearing surface, with alternated loop-bearing seats and lugs, the latter being adapted to be positioned between loops whereby the pin is prevented from accidental longitudinal displacement, said elements being provided on said bearing surfaces with longitudinally separated sets of cooperating interengaging integral formations relatively angularly adjustable, said formations being adapted to prevent relative bodily shift of the pin elements in a direction normal to the plane of the belt.

7. As an article of manufacture, a hinge pin for a belt fastening of the interdigitated loop type, said pin comprising two elements having opposed convex bearing surfaces continuously adapted to roll one on the other in any angular position of the elements, and a plurality of spaced sets of cooperating inter-engaging formations on the two pin elements, said formations of each set being of such respective lengths, considered lengthwise of the elements, as to restrain relatively bodily shift of the pin elements lengthwise of each other.

8. As an article of manufacture, a pin for belt fastenings, said pin comprising two elements having opposed curved bearing surfaces adapting the elements to adjust themselves relatively angularly, said elements being provided on the opposed bearing surfaces thereof with complemental sockets and projections, each projection being substantially coextensive with its corresponding socket, lengthwise of the pin elements, to thereby restrain relative longitudinal shift between the elements while permitting said angular movement.

9. As an article of manufacture, a hinge pin for belt fastenings and the like, said pin comprising two like elements each having a longitudinally extending convex bearing surface and alternated recesses and lugs on and spaced longitudinally of said bearing surfaces, the lugs being substantially co-extensive in length with the corresponding recesses considered lengthwise of the pin.

10. In a flexible power-transmitting member having interdigitated, transversely alined loops, an endwise removable hinge pin arranged to extend through said loops, said pin comprising two elements having opposed rolling bearing surfaces extending continuously from one edge to the other edge past the center line of each element and adapted for single line rolling contact in all operative angular positions of the two elements; and cooperating sets of interengaging formations at longitudinally spaced intervals on the two pin elements restraining relative bodily shift between the pin elements in a direction normal to the line of tension between the loops while permitting said rolling of the elements on each other.

JOHN C. OLSEN.